UNITED STATES PATENT OFFICE.

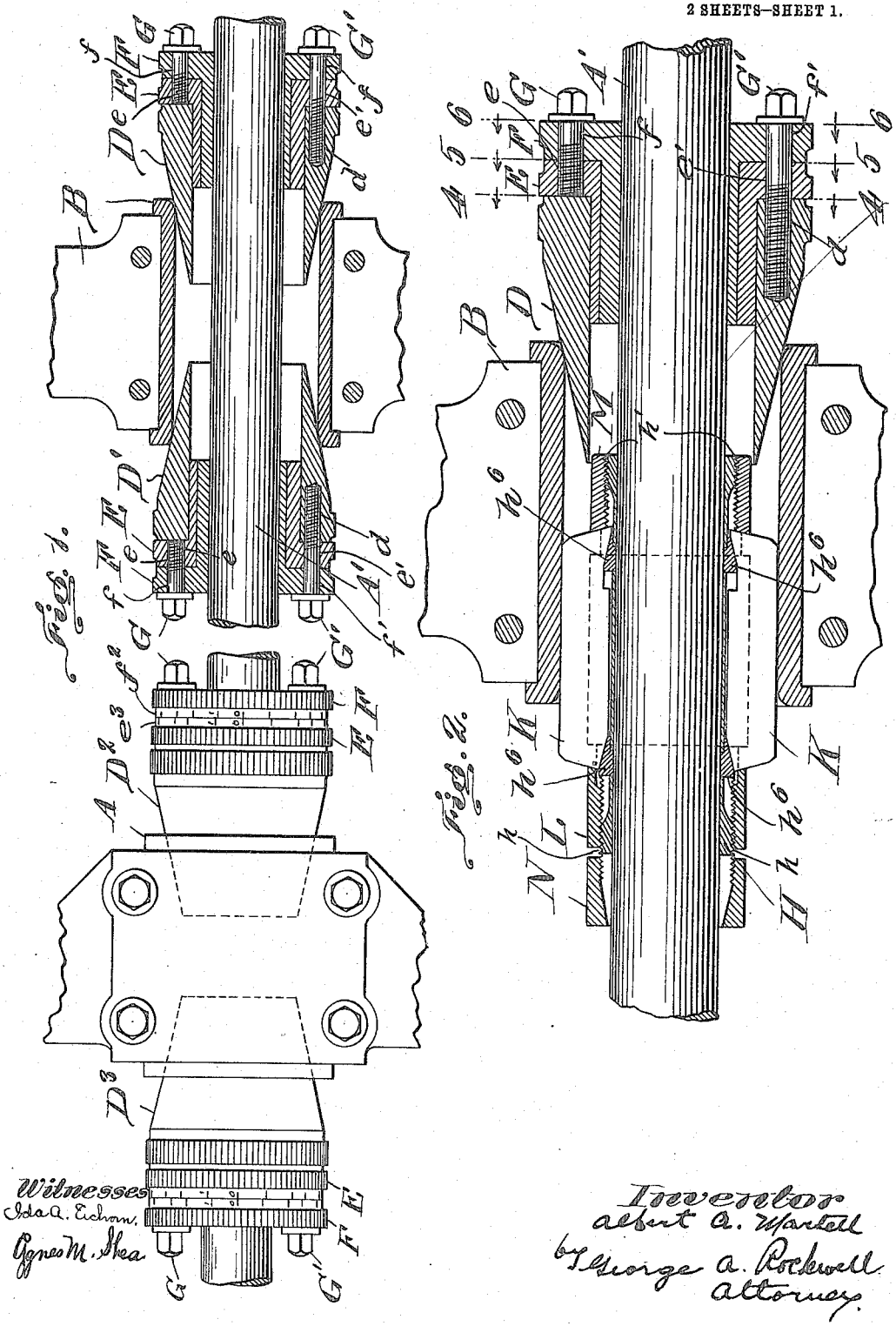

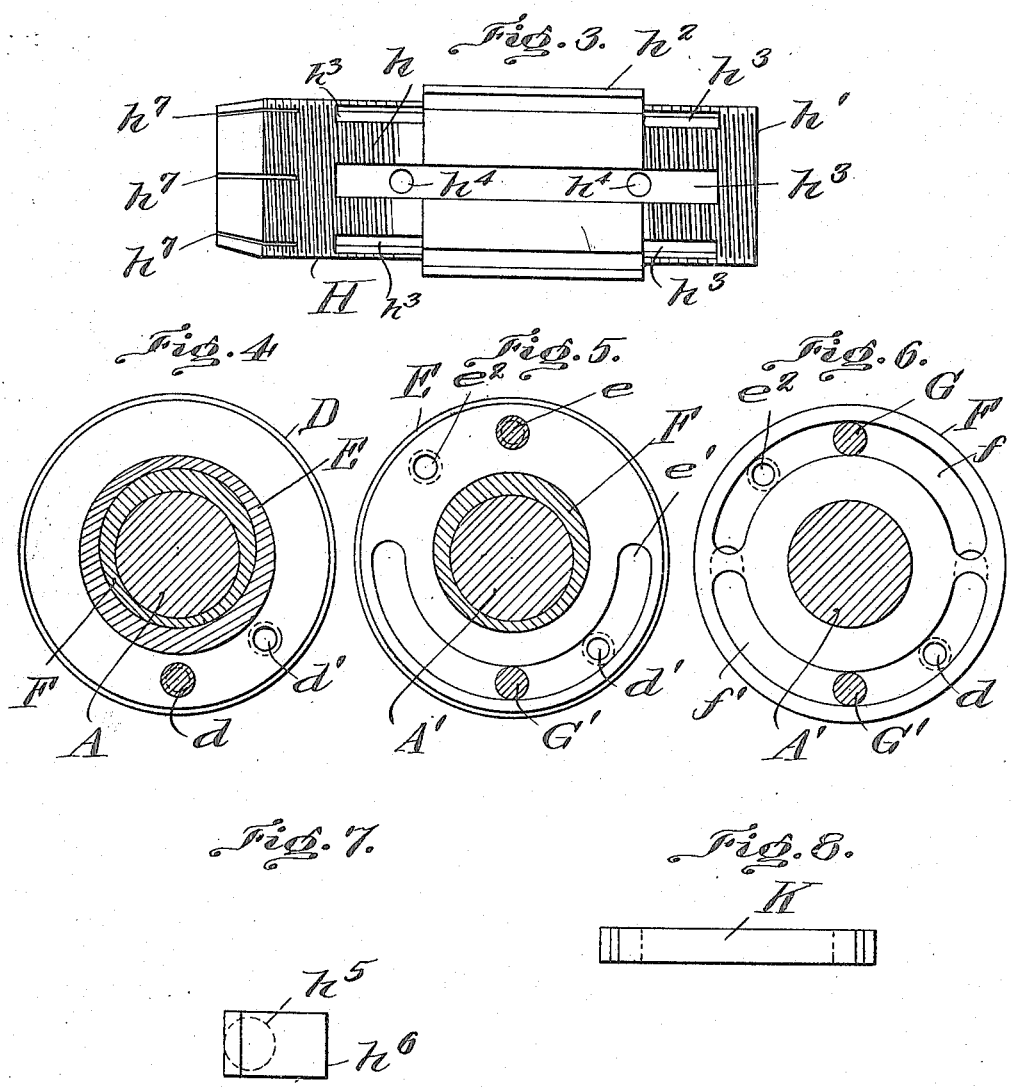

ALBERT A. MARTELL, OF BOSTON, MASSACHUSETTS.

TOOL FOR ALINING AND FINISHING SHAFT-BEARINGS AND THE LIKE.

1,135,460.  Specification of Letters Patent.  Patented Apr. 13, 1915.

Application filed September 8, 1913. Serial No. 788,536.  REISSUED.

*To all whom it may concern:*

Be it known that I, ALBERT A. MARTELL, of Boston, in the county of Suffolk and State of Massachusetts, have invented a new and useful Tool for Alining and Finishing Shaft-Bearings and the like, of which the following is a specification.

The main object of my invention is to provide means for accurately positioning a tool for finishing bearings for shafts and the like and my invention consists mainly in a temporary bearing having a member eccentrically arranged so that it may be moved to give exact adjustment with reference to fixed working points.

Other features of my invention are embodied in details of the tool.

In the drawings: Figure 1 is an elevation partly in section, illustrating the temporary bearings; Fig. 2 is a section on a larger scale illustrating my tool in use; Fig. 3 is a detail of the shank of the reamer; Figs. 4, 5 and 6 are sections on lines 4—4, 5—5 and 6—6 respectively of Fig. 2; Fig. 7 is a plan on a larger scale of the wedge member; and Fig. 8 is a plan of one of the blades.

I disclose my invention as embodied in a tool for reaming the bearings of a crank shaft of an automobile engine but my tool may be used for a great variety of purposes.

A and B represent two of the bearings of a crank shaft although there may be more such bearings in line.

D, D', $D^2$ and $D^3$ represent bushings whose exterior surfaces are conical and each having a threaded hole $d$. Fitting within each of the bushings is flanged sleeve E having screw threaded hole $e$ and semi-circular slot $e'$. Fitting within sleeve E is another flanged sleeve F having two semi-circular slots $f$ $f'$. Screw G passes through slot $f$ and engages the threading in hole $e$ and screw G' passes through slots $f'$ and $e'$ and engages the threading in hole $d$, these screws holding the bushing and the two sleeves in their proper position when finally adjusted. If desired an additional threaded hole $d'$ may be provided in member D and an additional threaded hole $e^2$ in member E in order to provide for holding in other rotative positions. The inner sleeve has a scale at $f^2$ consisting of, for example, 20 graduations, while sleeve E has scale portion $e^3$ having, for example, 19 graduations so that relative movement of these scale portions which brings graduation 1 on one scale opposite graduation 1 on the other will indicate that movement of say one-thousandth of an inch will have been given to the shaft as hereinafter pointed out.

It will be noted that the exterior of member F is eccentric to its interior which fits shaft A' and that the interior of member E is eccentric to its exterior and these eccentricities are preferably about equal. The interior and exterior surfaces of the bushing are concentric with shaft A'.

When the shaft has been properly positioned or alined the reaming tool is applied and this consists in the shank H threaded at $h$ and $h'$ and having boss $h^2$ in which are a plurality of recesses $h^3$ to receive and hold the blades K. At the bottom of each recess $h^3$ are two holes $h^4$ $h^4$ to receive the circular portion $h^5$ of wedge members $h^6$ which are removably mounted in the recesses $h^3$, swinging movement being prevented by the side walls of the slot and longitudinal movement by the engagement of portion $h^5$ in hole $h^4$. These wedge members give a very large movement of the blades away from the shank in proportion to a very small movement along the shank and this is an important feature of compactness in my device, and the removability of the wedge member provides an easy means of making sure that the wedge surface will always be accurate by substituting a new wedge as desired and in this way I do away with the necessity of truing the shank itself. Nuts L and M are interiorly threaded to engage threaded portions $h$ $h'$ and engage the blades to hold them in position. One end of the shank H is split at a plurality of points such as $h^7$ $h^7$ and the outer end of the shank is engaged by nut N so that when the nut is screwed to the right in Fig. 2 the shank will be clamped firmly against the shaft A'.

As clearly appears in Figs. 4 and 5 shaft A' is non-concentric with the outer surface of sleeve F and this provides what is in effect a wedge action when the sleeve or sleeves are rotated in order to force the axis of the shaft into the desired position.

In using my device I place one of the temporary bearings including the sleeves and the bushings D and $D^3$ on each end of the shaft and then insert the bushings within the bearings as accurately as may be convenient. I then rotate the two sleeves of each temporary bearing within their bushing with such movement with relation to each other as may be required until the axis of the shaft is at the exact distance required from the two working points, such for example, as the cylinders and the gear shaft or shafts. If the eccentricity of the center of the shaft and the center of the inner sleeves is, for example, three-sixty-fourths of an inch, the center of the shaft may be positioned at any point within the circumference of a circle having a diameter of three-thirty-seconds of an inch I then adjust the bearing having bushing D' and this may be done with sufficient accuracy by starting with the two zeros of adjacent scales opposite each other and then turning one or both of the sleeves until the inner sleeve binds against the shaft. This might show on the scale a variation of three scale graduations in which case I turn the sleeve back about half of the distance covered in the forward rotation. This divides any slight inaccuracy and is sufficiently accurate for this bearing and this same thing is done with the bearing having bushing $D^2$. When the shaft has been thus accurately positioned it is partially withdrawn and one of the temporary bearings such as that with the bushing D' is removed. The reaming tool is applied to the shaft and brought into position for reaming. When the bearing has been reamed to the extent shown in Fig. 2 the bearing having bushing D is removed and the reamer, having itself now become properly centered, will continue the reaming until the whole bearing is finished. Any suitable means may be provided for rotating the reamer. When one bearing has been finished the temporary bearings may be reinserted and the other bearing or bearings may be finished in similar fashion.

I do not make claim in this application for the subject-matter of the reamer as I intend to make that the subject of a separate application.

What I claim is:

1. A temporary bearing comprising an exteriorly conical bushing, a sleeve rotatably mounted within the conical bushing, and a second sleeve rotatably mounted within the first sleeve and having a bore eccentrically disposed with relation to the exterior of said second sleeve.

2. A device of the character described comprising a shaft adapted to carry a tool; a plurality of temporary bearings for said shaft, each comprising an exteriorly conical bushing, a sleeve rotatably mounted within the conical bushing, and a second sleeve rotatably mounted within the first sleeve and made with a shaft receiving bore eccentrically disposed with relation to the exterior of said second sleeve.

3. A device of the character described comprising a shaft adapted to carry a tool; a plurality of temporary bearings for said shaft, each comprising an exteriorly conical bushing, a sleeve rotatably mounted within the conical bushing, and a second sleeve rotatably mounted within the first sleeve and made with a shaft receiving bore eccentrically disposed with relation to the exterior of said second sleeve, and a tool for said shaft for operating upon the bearing to be finished.

4. A device of the character described comprising a shaft adapted to carry a tool; a plurality of temporary bearings for said shaft, each comprising an exteriorly conical bushing, a sleeve rotatably mounted within the conical bushing, and a second sleeve rotatably mounted within the first sleeve and made with a shaft receiving bore eccentrically disposed with relation to the exterior of said second sleeve and means for fastening the two sleeves together and to the bushing in their adjusted relative positions.

5. A device of the character described comprising a shaft adapted to carry a tool; a plurality of temporary bearings for said shaft, each comprising an exteriorly conical bushing, a sleeve rotatably mounted within the conical bushing, and a second sleeve rotatably mounted within the first sleeve and made with a shaft receiving bore eccentrically disposed with relation to the exterior of said second sleeve, said exterior being eccentric to the exterior of the first sleeve.

6. A temporary bearing comprising a member adapted for connection to a permanent bearing; a second member rotatably mounted in the first member; and a third member rotatably mounted in the second member and having a bore eccentrically disposed with relation to the exterior of said third member.

ALBERT A. MARTELL.

Witnesses:
GEORGE A. ROCKWELL,
ARTHUR F. RANDALL.

Copies of this patent may be obtained for five cents each, by addressing the "Commissioner of Patents, Washington, D. C."